United States Patent [19]

Banning et al.

[11] Patent Number: 5,471,613
[45] Date of Patent: Nov. 28, 1995

[54] TREE STRUCTURE REPRESENTATION OF AN SQL CLAUSE

[75] Inventors: Kenneth R. Banning; Wendy S. James; Shih-Gong Li, all of Austin; Anton Versteeg, Georgetown, all of Tex.

[73] Assignee: International Business Machines Corporation, Armonk, N.Y.

[21] Appl. No.: 289,142

[22] Filed: Aug. 11, 1994

Related U.S. Application Data

[63] Continuation of Ser. No. 628,543, Dec. 17, 1990, abandoned.

[51] Int. Cl.$^6$ .................................................. G06F 17/30
[52] U.S. Cl. .................. 395/600; 364/974.1; 364/974.6; 364/963; 364/DIG. 2
[58] Field of Search ..................................... 395/600, 161

[56] References Cited

U.S. PATENT DOCUMENTS

| | | | |
|---|---|---|---|
| 4,451,901 | 5/1984 | Wolfe et al. | 395/600 |
| 4,506,326 | 3/1985 | Shaw et al. | 395/700 |
| 4,688,195 | 8/1987 | Thompson et al. | 395/12 |
| 4,829,427 | 5/1989 | Green | 395/600 |
| 5,091,852 | 2/1992 | Tsuchida et al. | 395/600 |
| 5,175,814 | 12/1992 | Anick et al. | 395/161 |

OTHER PUBLICATIONS

"Method of Detecting Atomic Boolean Factors" IBM Technical Disclosure Bulletin v. 32 n. 5B pp. 368–375 (1989).
Neill "Introduction to Computer Science" West Publishing pp. 305–336 (1979).
Anick et al "A Direct Manipulation Interface for Boolean Information Retrieval via Natural Language Query" ACM Proc. Int'l SIGIR '90, pp. 135–150, 1990.

*Primary Examiner*—Thomas G. Black
*Assistant Examiner*—Peter Y. Wang
*Attorney, Agent, or Firm*—Casimer K. Salys

[57] ABSTRACT

A system, program and method for graphically representing a WHERE or HAVING clause of an SQL query directed to a relational database. Logical operators are defined and linked to predicates using a tree structure format. The tree is not binary in character and consequently exhibits a 1:1 relation between the predicates and tree leaves. The tree structure representation provides intuitive feedback to the user defining the query. Preferably the SQL format and tree structure graphic format queries appear simultaneously on the video display of the computer system used to define the query.

5 Claims, 23 Drawing Sheets

① A new predicate "DEPT IN bestdept" is defined and the screen display is changed to show this new predicate in the Row Cond window.

① By using the same technique as described in FIG. 5B, "YEAR < 10" and "DEPT IN bestdept" are linked by "AND".

① By using the same technique as described in FIG. 5B, link the 2 "AND" nodes by "OR". The Row Cond window now shows a complete tree structure for WHERE clause.

② The WHERE clause in SQL select statement is shown in the SQL window.

FIG. 6A

```
START
  ↓
INITIALIZATION
SET STATUS SETTINGS OFF
  ↓
 (A)
```

FIG. 6B

```
       (A)
        ↓
 ( New_Predicate_Defined )
        ↓
 Increment Total # of predicates currently defined
        ↓
 Assign a unique # to this new predicate
        ↓
 Locate a position to show this
 predicate in Row_Cond_Window
        ↓
      < DEFAULT >  --NO-->
        | YES                         |
        ↓                             |
   < The 2nd Pred. > --NO--> Link this predicate
        | YES                with Default_Node
        ↓                             |
 Create an AND node link the first 2 predicates with it
 Mark this AND node as Default_Node
        ↓←----------------------------+
        ○
        ↓
 Clean Up all Status Settings ( Group,
 LINK, OP_CHANGE, SELECTED )
        ↓
       (A)
```

TREE STRUCTURE REPRESENTATION OF AN SQL CLAUSE

This is a continuation of application Ser. No. 07/628,543 filed Dec. 17, 1990 now abandoned.

BACKGROUND OF THE INVENTION

The present invention relates in general to an interface between a human user and a computerized relational database. More particularly, the invention is directed to a system and method for creating relational database queries using graphical tree structure depictions, to express WHERE and HAVING clauses.

The entry and retrieval of data via interactive terminals is now a common practice. Large volumes of data stored on magnetic disks, optical disks, or other contemporary non-volatile storage media, are accessed locally or through networks using terminals or functionally equivalent workstations or personal computers. Such prevalent uses of databases has created an environment in which the level of data processing skill possessed by an average user is disproportionately low in relation to the complexity of the hardware and software functions available to interact with the database. This is particularly true for relational databases, where the information content is significant yet the query mechanisms for defining the desired information involve esoteric data definitions and groupings. Though the technology of accessing information has progressed beyond the use of structured query language (SQL) statements to the use of query by example (QBE) and prompted query techniques, there remains a need for further simplification and ease of use.

Relational database query expressions with WHERE and HAVING clauses are well known to those who have a working knowledge of SQL. However, the expressions can become quite lengthy and lose their intuitive meaning as the number of predicates and relationships in the query increases. Thus, there has evolved a need for a system and method which allows a moderately skilled user to create and manipulate WHERE and HAVING clauses in relational database queries.

U.S. Pat. No. 4,506,326 teaches the use of query by example (QBE) to formulate structured query language (SQL) syntax. Unfortunately, the QBE approach is limited in application and does not provide in graphical or other pictorial form an intuitive representation of what the expression represents in relation to the information in the database.

The use of tree-like graphics to represent Boolean logic is not new. Tree representations are used in hypercard type applications and artificial intelligence depictions. The use of Boolean factor trees to represent SQL statements is discussed in an article entitled "Method of Detecting Atomic Boolean Factors" as appeared on pages 368–374 of the *IBM Technical Disclosure Bulletin*, Vol. 32, No. 5B, dated October 1989. Therein it is noted that WHERE and HAVING clauses of SQL statements can be represented by Boolean factor trees. However, it is also noted that Boolean factor trees are binary. Boolean factor trees have a structure which loses intuitive worth when the number of predicates associated with a logical operation exceeds two.

A representative relational database is a part of the OS/2 (trademark of IBM Corporation) Extended Edition operating system program, available from IBM Corporation, as particularly suited for use in a PS/2 (trademark of IBM Corporation) workstation. A preferred configuration for the workstation includes a graphics display, a keyboard, a mouse and cabinet resident hard disk drive. A typical workstation would also include communication and networking cards suitable to access remote databases or databases resident on host computers. In the context of such configurations, there exists a need for a system and method by which a user of moderate database expertise can define, manipulate and utilize a relational database query including those constructed with relatively complex WHERE and HAVING clauses.

SUMMARY OF THE INVENTION

The invention presented herein defines systems, programs and processes for using graphical representations of WHERE and HAVING clauses to define and intuitively represent queries for relational databases. The invention contemplates the use of tree structures having logical operators, such as OR and AND, to link predicates. The use of graphics and fundamental logical operators provides the user with a pictorial representation of the expression being created or modified. The tree structure has a form which is amenable to conversion into SQL using commonly known parsing techniques.

The intuitive quality of the graphical representation according to the present invention is attributable to the use of an SQL related tree structure which has resources to handle two or more predicates for each logical node. This tree representation provides a 1:1 mapping between predicates and the leaf nodes of the tree. In contrast, conventional Boolean factor trees constrain the number of permissible leaves to two per logical node, creating structures which commonly fail to have a 1:1 mapping. The mapping as provided by the tree structure of the present invention retains the intuitive link between the graphical representation and the query objective sought by a user of moderate skill when interfacing to a relational database.

These and other aspects of the invention will be understood and appreciated with greater specificity upon considering the detailed description which follows.

BRIEF DESCRIPTION OF THE DRAWINGS

FIGS. 6A–6J schematically illustrate flow diagrams of the program operation.

DESCRIPTION OF THE PREFERRED EMBODIMENT

Figure 1:
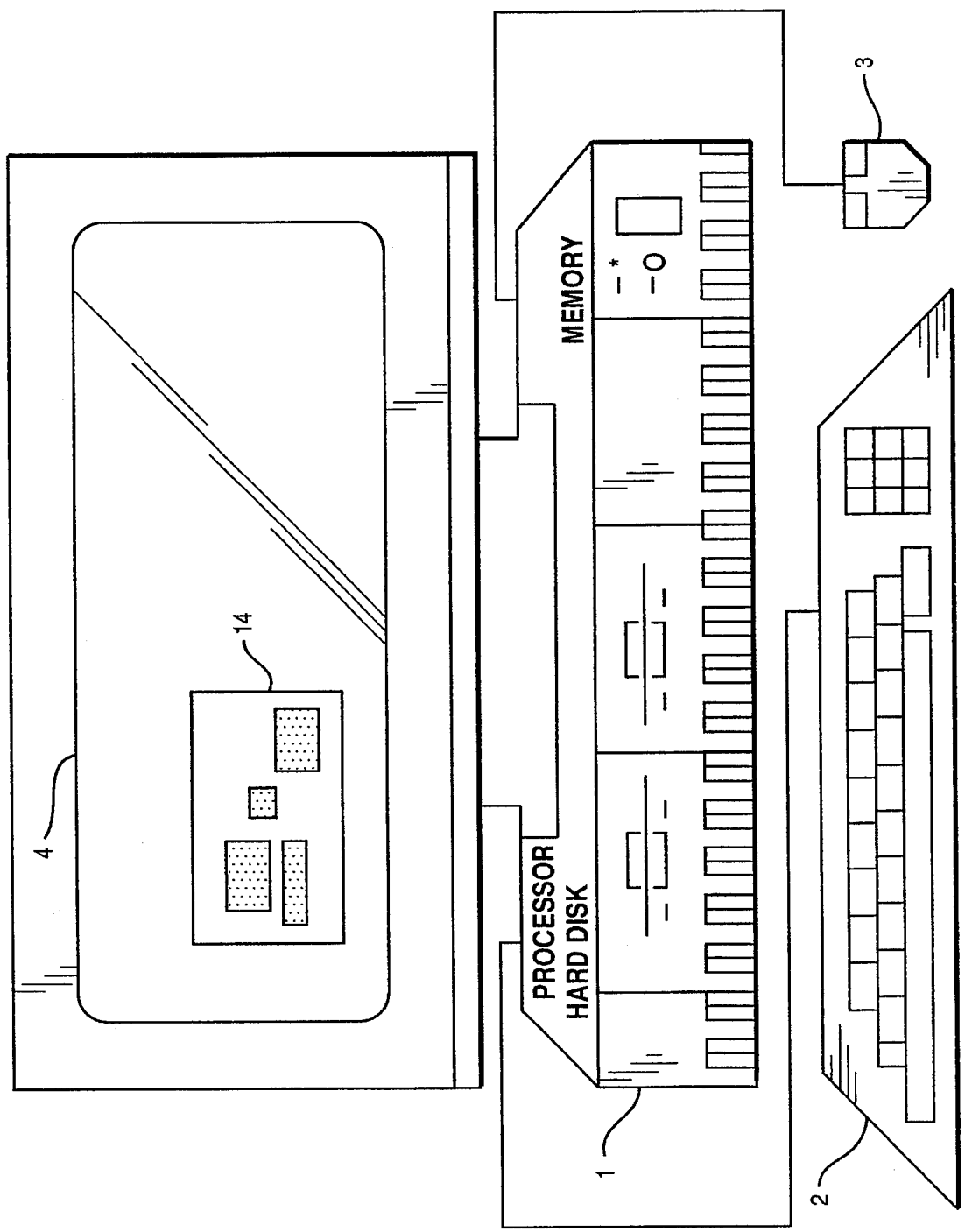
FIG. 1 is a schematic block diagram of a workstation using a graphics media to define a SQL query.

FIG. 1 illustrates the operating environment to which the invention pertains. As such, the invention preferably includes and utilizes a PS/2 workstation having a cabinet 1 (with resident processor, memory, and disk storage), keyboard 2, user interactive mouse-type control 3, and graphics quality video display 4. The workstation preferably also includes within cabinet 1 a hard or optical disk non-volatile memory, a local area network board, and a communications board. The non-volatile storage provides resident database capability, while the boards provide communication interfaces to network or host resident databases. The preferred operating system for the workstation is the OS/2 Extended Edition. Such operating system provides the user with resources to create and interact with the OS/2 Extended Edition relational database using SQL statements.

The WHERE and HAVING query clauses, which are frequently used in SQL statements, have proven to be difficult for moderately skilled users to create and understand when formulated in SQL language. To a significant extent the difficulty is attributed to the structure of such SQL clauses, in that the clauses involve strings of text grouped by multiple parentheses.

Figure 2:
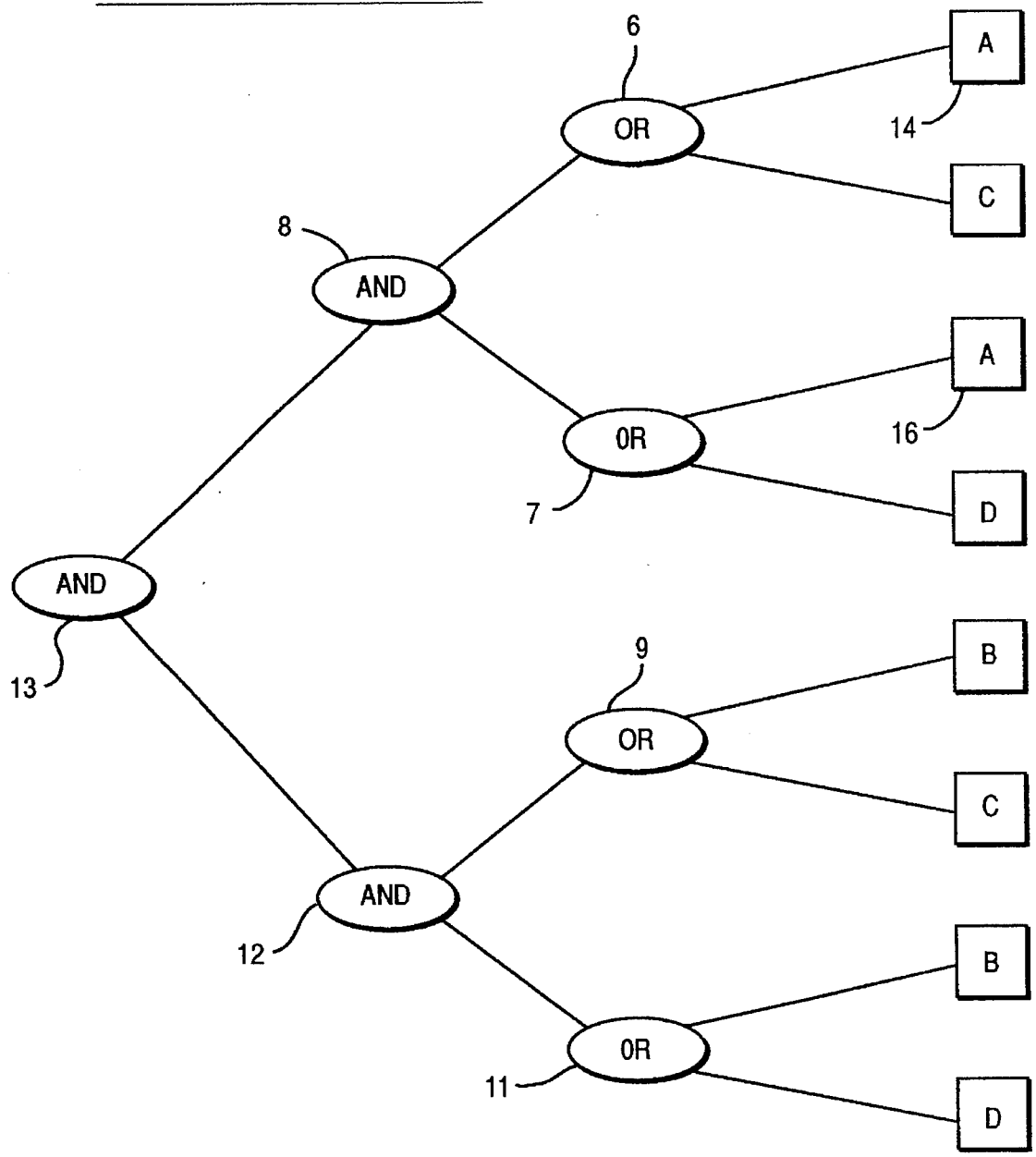
FIG. 2 illustrates a prior art Boolean factor tree.

Boolean factor trees have been used in compilers to parse program expressions into forms amenable for manipulation by digital computers. FIG. 2 illustrates a Boolean factor tree for the expression (A AND B) OR (C AND D). In keeping with the convention of the Boolean factor tree, each logical operator relates only two predicates. Thus, the leaves of the tree, such as elements A, B, C and D, are connected in binary pairs to each logical operator, here the operator OR. This binary character is reflected at each level, in that there are two OR nodes 6 and 7 for AND node 8 as well as two OR nodes 9 and 11 for AND node 12. The same binary character exists between the two AND nodes 8 and 12 and their relating logical operator in node 13. As a consequence of its binary structure, the Boolean factor tree requires leaf node predicates to be repeated in the depiction, such as predicate A both in blocks 14 and 16. Such predicates only appear once in the logical expression. The unfortunate outcome of using such a tree is that the intuitive link between the meaning of expression (A AND B) OR (C AND D) and any meaning acquired from its pictorial representation is effectively nonexistent. The use of Boolean factor trees to represent WHERE and HAVING clauses within an SQL statement are considered within the aforementioned *IBM Technical Disclosure Bulletin*.

The invention provides a tree structure which maintains the intuitive link between the graphical representation and the desired relationship as specified in the SQL WHERE and HAVING clauses. To further assist the user, the invention also provides a system, program and method which translates between SQL clauses and the tree structures to allow the user to concurrently perceive through multiple media, i.e., tree graphics and SQL text, the effects of any changes to the WHERE and HAVING clauses. These features are preferably provided in the context of the workstation depicted in FIG. 1, using a window such as 13 on video display screen 4.

Figure 3:
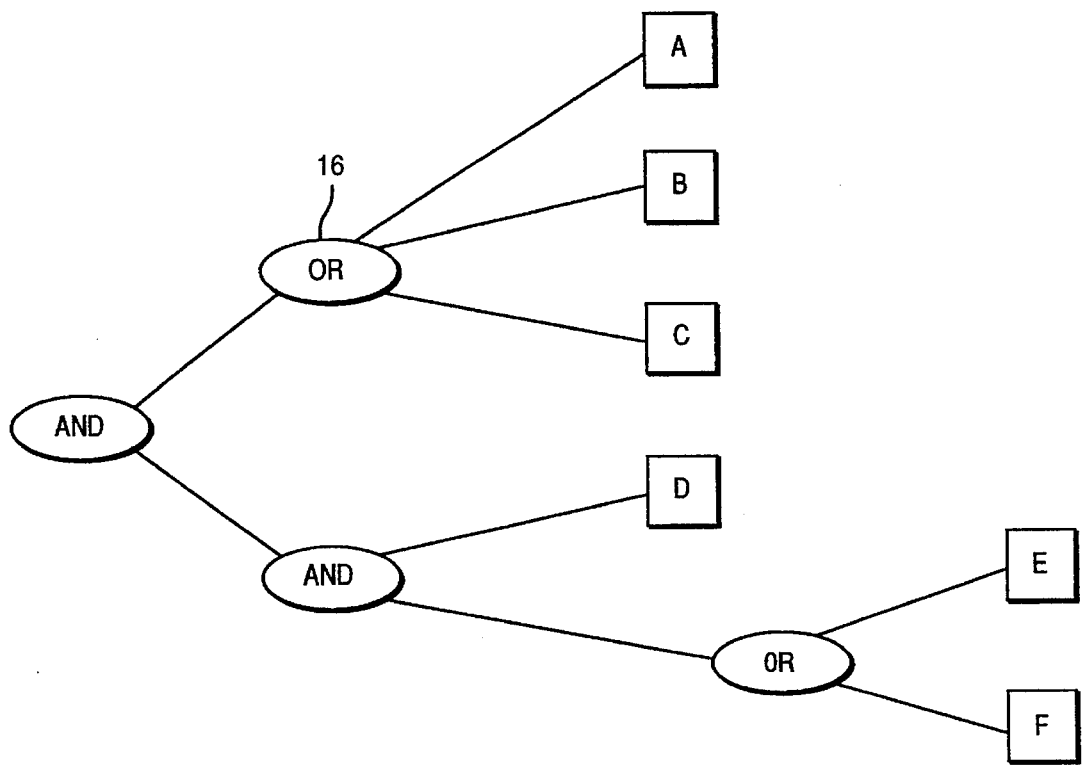
FIG. 3 illustrates a tree according to the present invention.

FIG. 3 illustrates a tree structure according to the present invention for representing the logical arrangement (A OR B OR C) AND (D AND (E OR F)). In contrast to the Boolean factor tree, note that three leaves, A, B and C, extend from OR node 16. As such, the tree is no longer binary. Note also that each leaf predicate appears only one time within the tree. The benefits of such a tree structure for expressing a WHERE or HAVING clause become even more evident upon comparing the intuitive relationship acquired from considering the pictorial representation to the logical relationship defined by the Boolean expression. The relationships between the predicates A–F are fairly clear even to a user of moderate skill with query formulation. Foremost, there exists a singular translation between the graphical representation and the SQL statement which it represents.

Figure 4A:
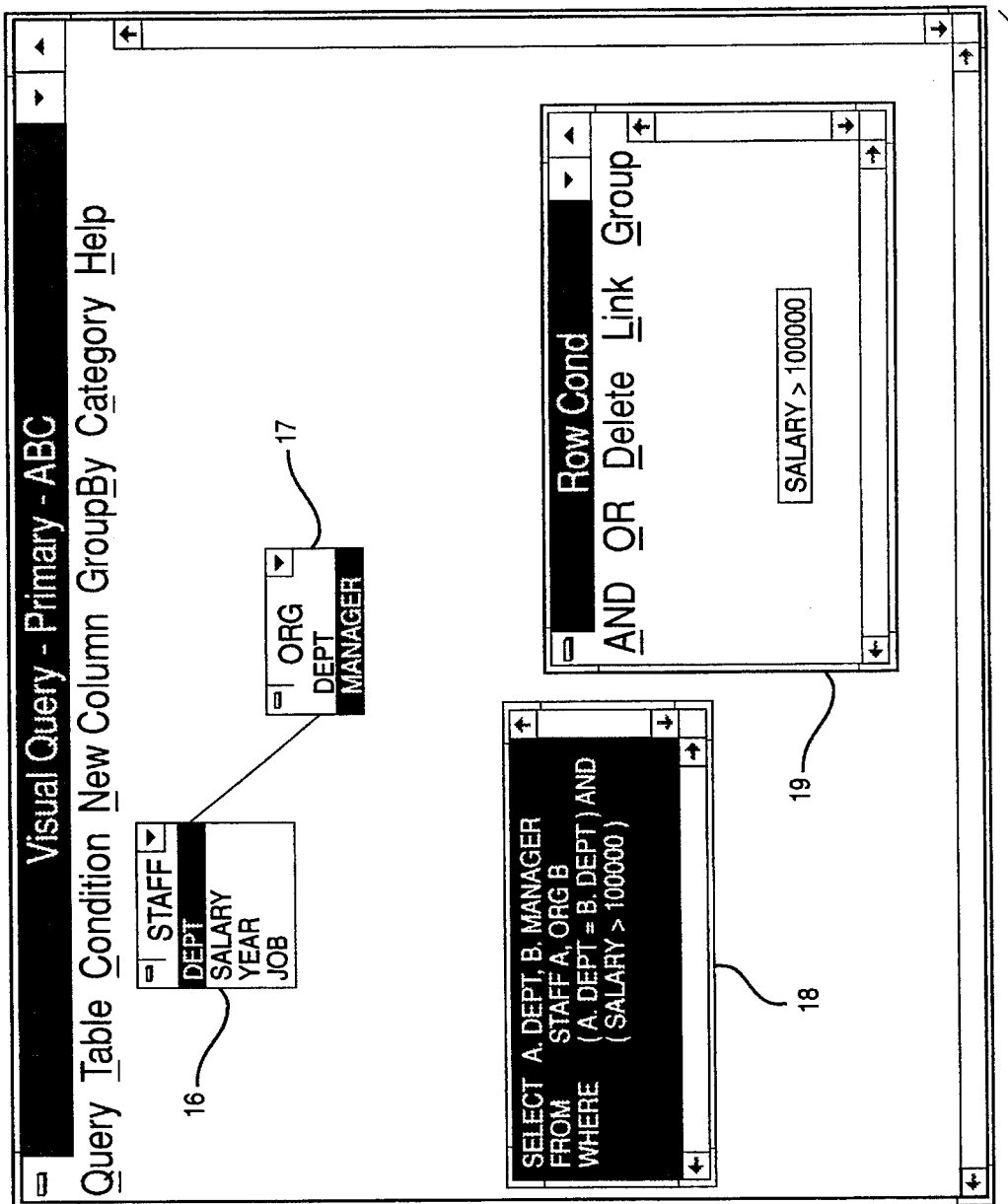
FIGS. 4A–4C schematically illustrate windows used for defining a query.
Figure 4B:
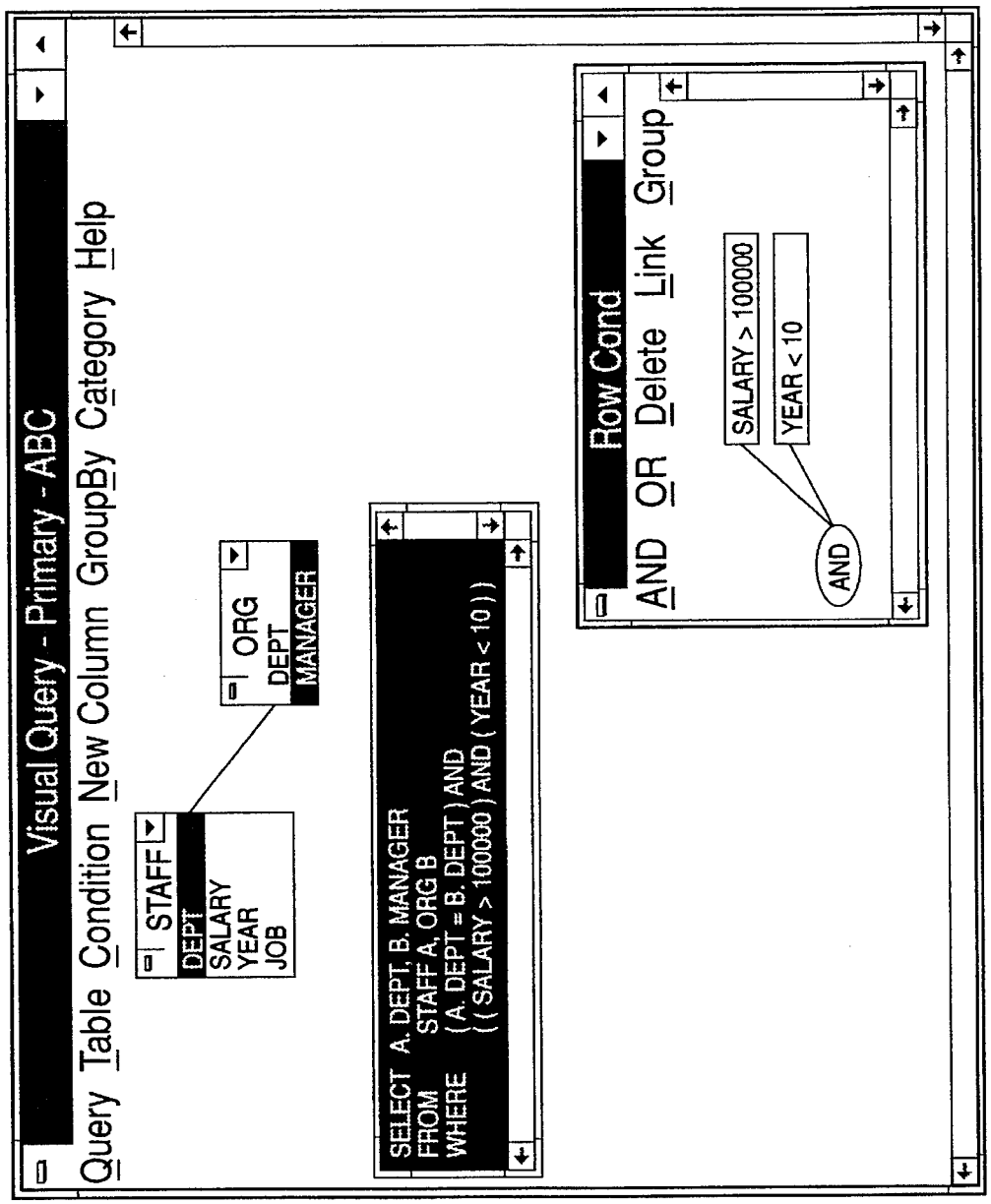
Figure 4C:
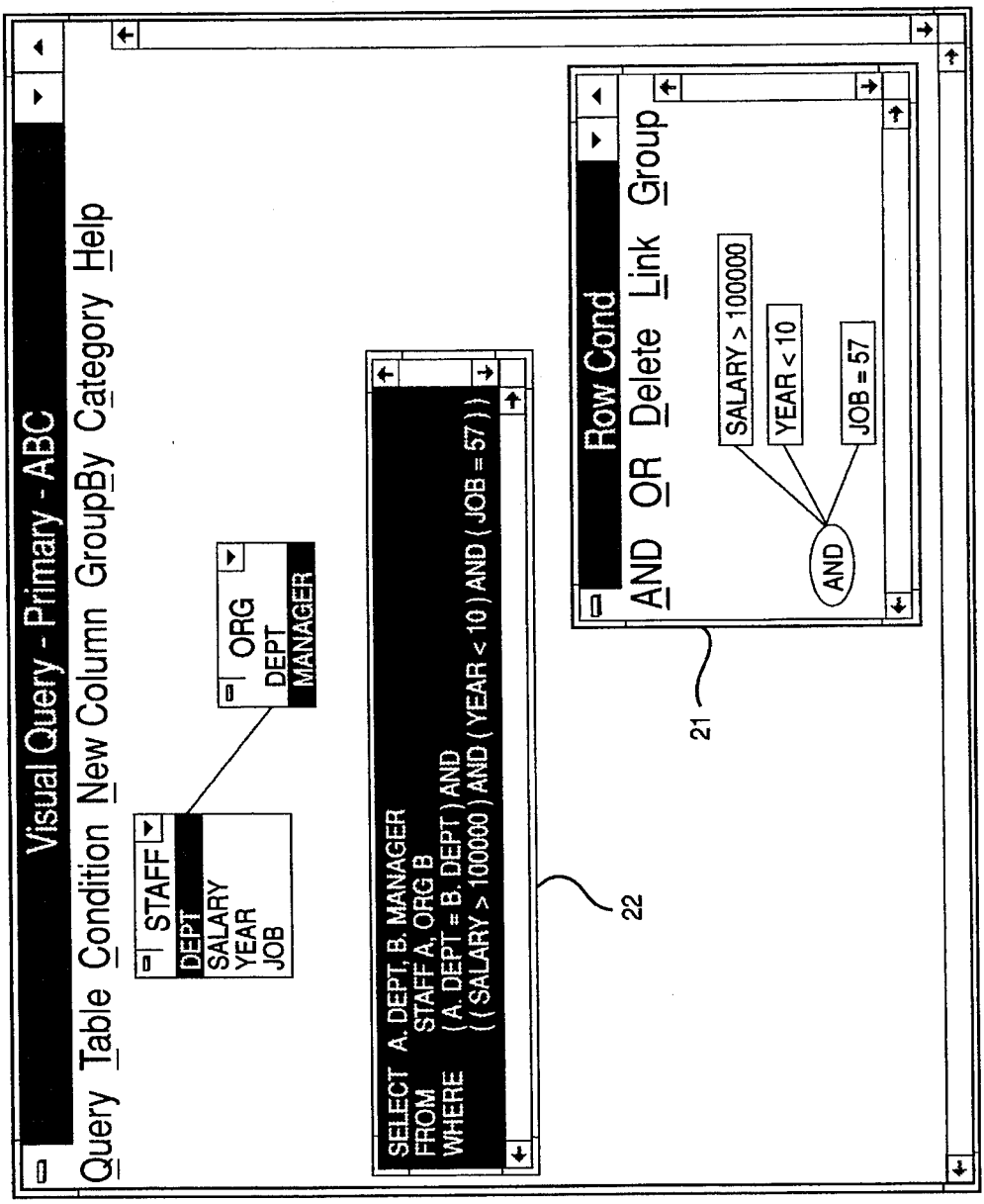

The preferred implementation of the invention is presented by way of simple examples in FIGS. 4A–4C, and by extension into refined examples in FIGS. 5A–5I. FIG. 4A shows at 14 the primary window of a query as would appear on workstation screen 4 (FIG. 1), and includes therein subwindows individualizing the columns to which the query is to be directed. In this case the columns are "STAFF" and "ORG", respectively at reference numerals 16 and 17. Also present in window 14 is subwindow 18, showing the SQL statement being defined by the query. The invention is directed to subwindow 19, wherein the predicates of the query are defined and related by logical operators "AND" and "OR". The images which appear in FIGS. 4A–4C depict the succession of operations and effects which define a relatively simple query. FIG. 4A shows the specification of an argument, defining that the desired information relates to "STAFF" having a "SALARY" greater than 100,000. FIG. 4B illustrates the effects of linking the "SALARY" argument with a predicate specifying "YEARS" less than 10 via the logical AND condition. FIG. 4C depicts the further inclusion of a "JOB" category 57, again relating through the logical AND operator. The tree representation is created by user manipulation of a mouse and keyboard and is visually portrayed in subwindow 21. The corresponding SQL statement appears in block 22.

The pictorial and SQL WHERE clause defined in FIG. 4C can be created, according to the preferred practice of the invention, by manipulation of either the SQL statement in subwindow 22 or the tree structure in subwindow 21. Where the user has the ability to specify the SQL statement directly in subwindow 22, the preferred practice of the invention generates its graphical equivalent by tree representation in subwindow 21. This is accomplished by applying existing parsing techniques to the SQL statement and thereby derive the predicates and relating logical operators.

The features of the invention are most valuable to a moderately skilled user, one more likely to define the query containing WHERE or HAVING clauses in subwindow 21 using the graphical method. Namely, the user creates a tree structure representation of the desired WHERE or HAVING clauses by entering predicates, selecting logical operators, and relating the predicates to the operators. The tree structure so defined is used by the system to generate the equivalent SQL statement in subwindow 22. It is worth noting that the user is not burdened with the particulars of the SQL language, but rather can depend upon the intuitive characteristics represented by the tree depiction of the clause. It should also be apparent that a binary tree of the Boolean form would be incapable of readily representing the three predicates in subwindow 21, which combination is needed to represent the clause.

Figure 5A:
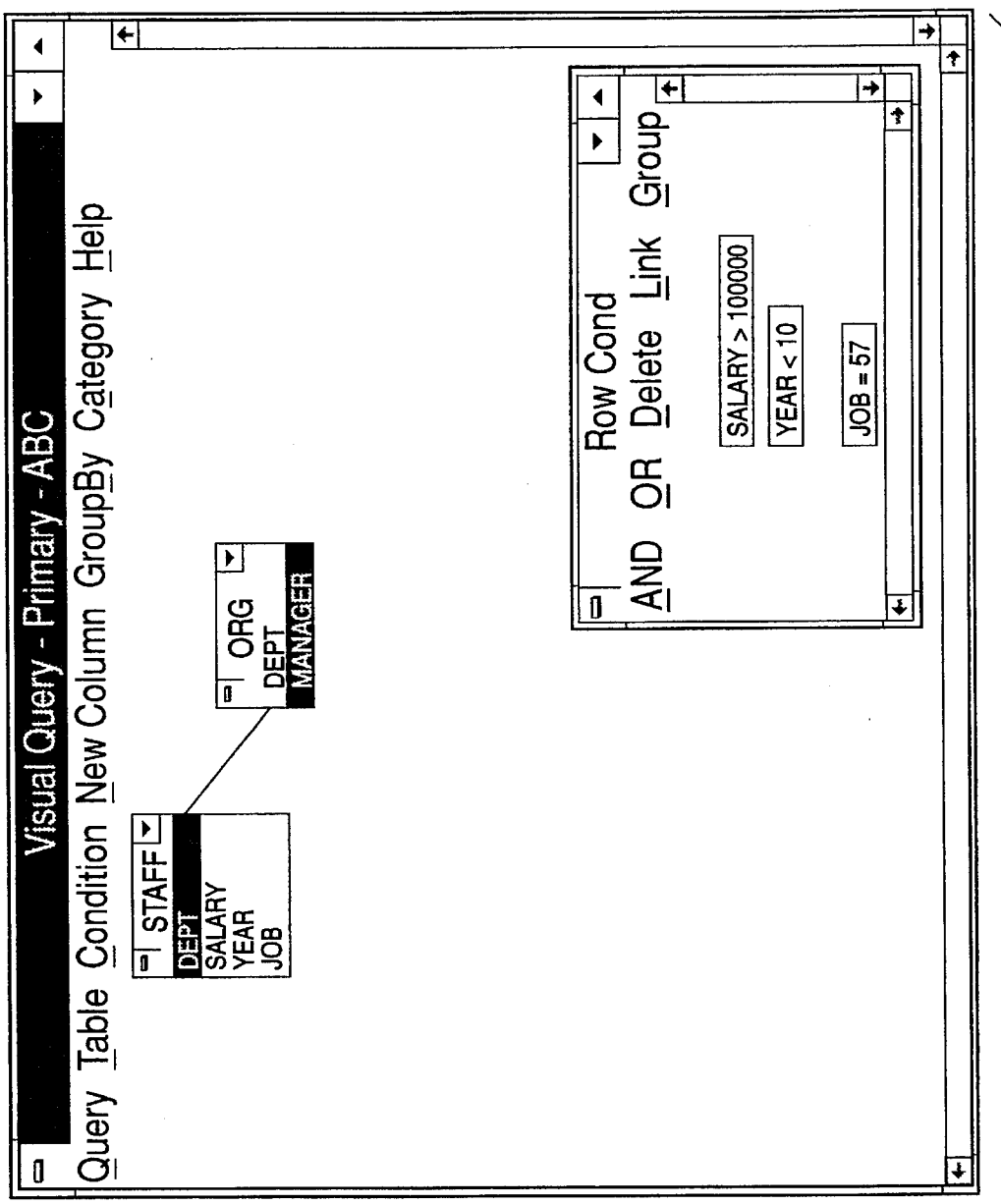
FIGS. 5A–5I schematically illustrate windows for refining and expanding the query.
Figure 5B:
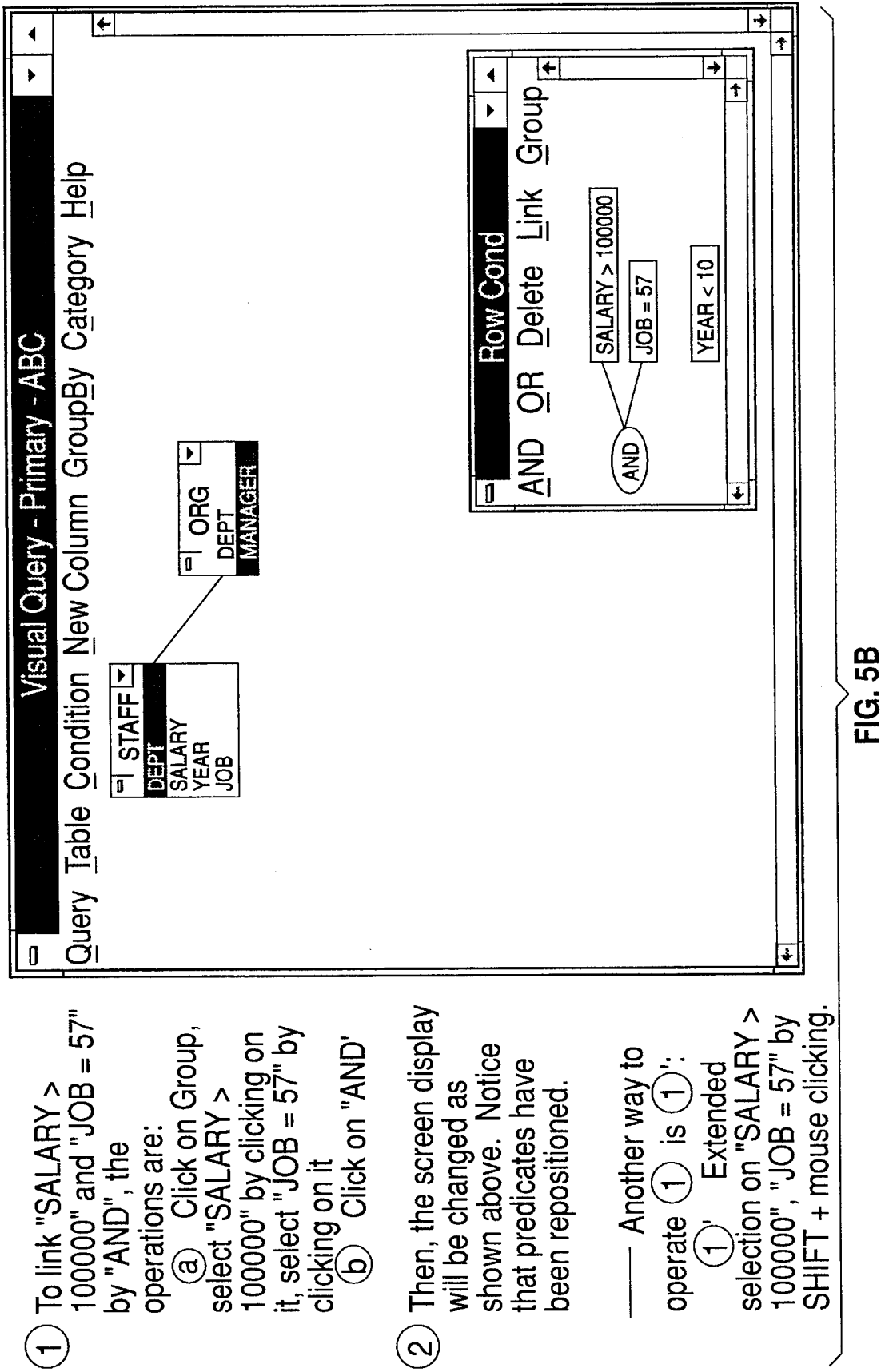
Figure 5C:
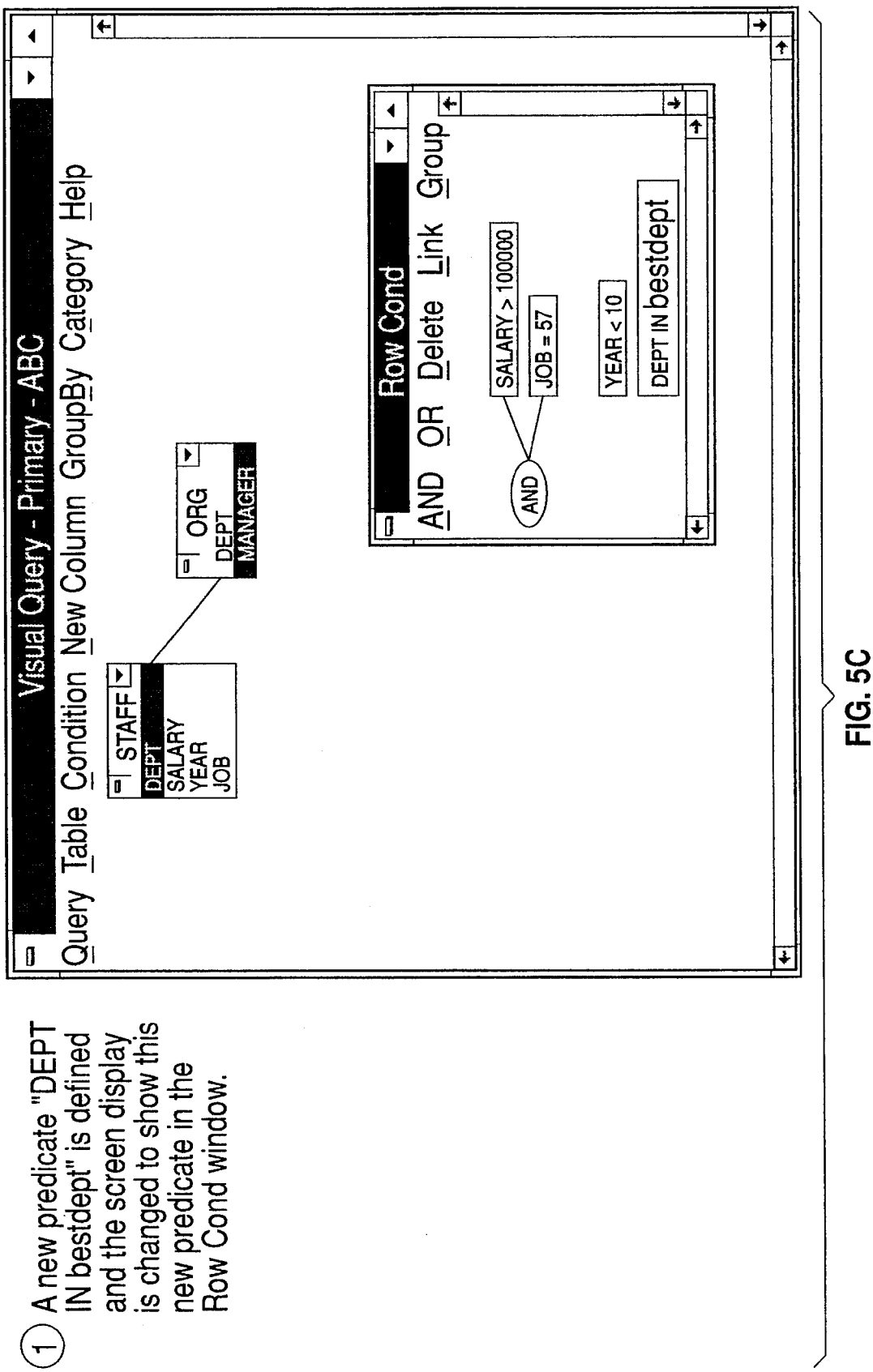
Figure 5D:
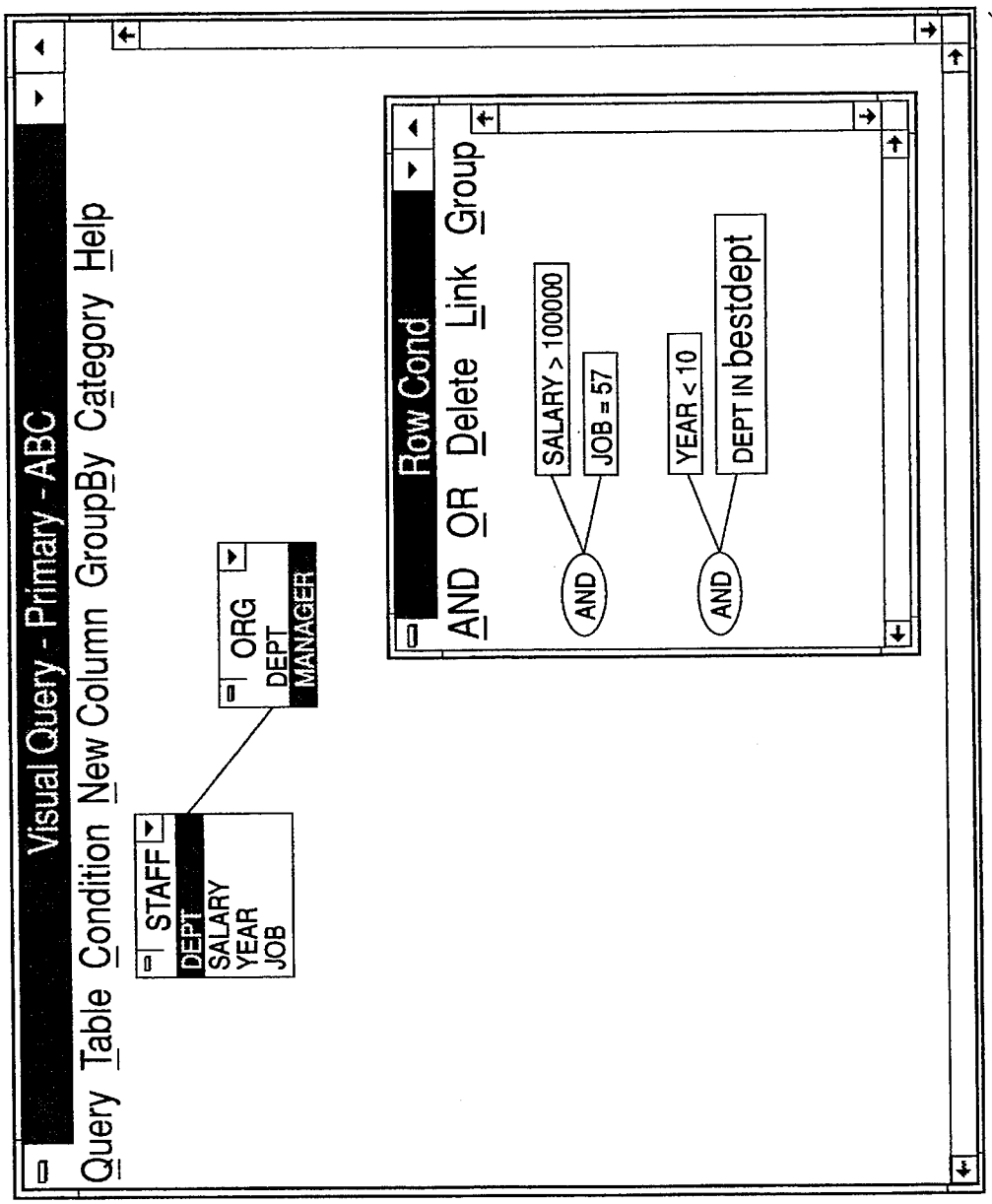

The succession of FIGS. 5A–5I illustrate an extension of the earlier example to more elaborate query and modification practices. As shown in FIG. 5A, the three previously defined predicates are unlinked for further refinement. FIG. 5B shows the linking of two predicates through a logical AND operator, and the further addition of another predicate to reach the stage depicted in FIG. 5C. The second set of two predicates is then linked as appears in FIG. 5D using a logical AND operator. The concluding clause is depicted by tree structure in FIG. 5E, therein showing a logical combination of the two AND operators via a common OR operator. The SQL statement corresponding to the tree representation appears as a classic SQL statement in subwindow 24.

Figure 5E:
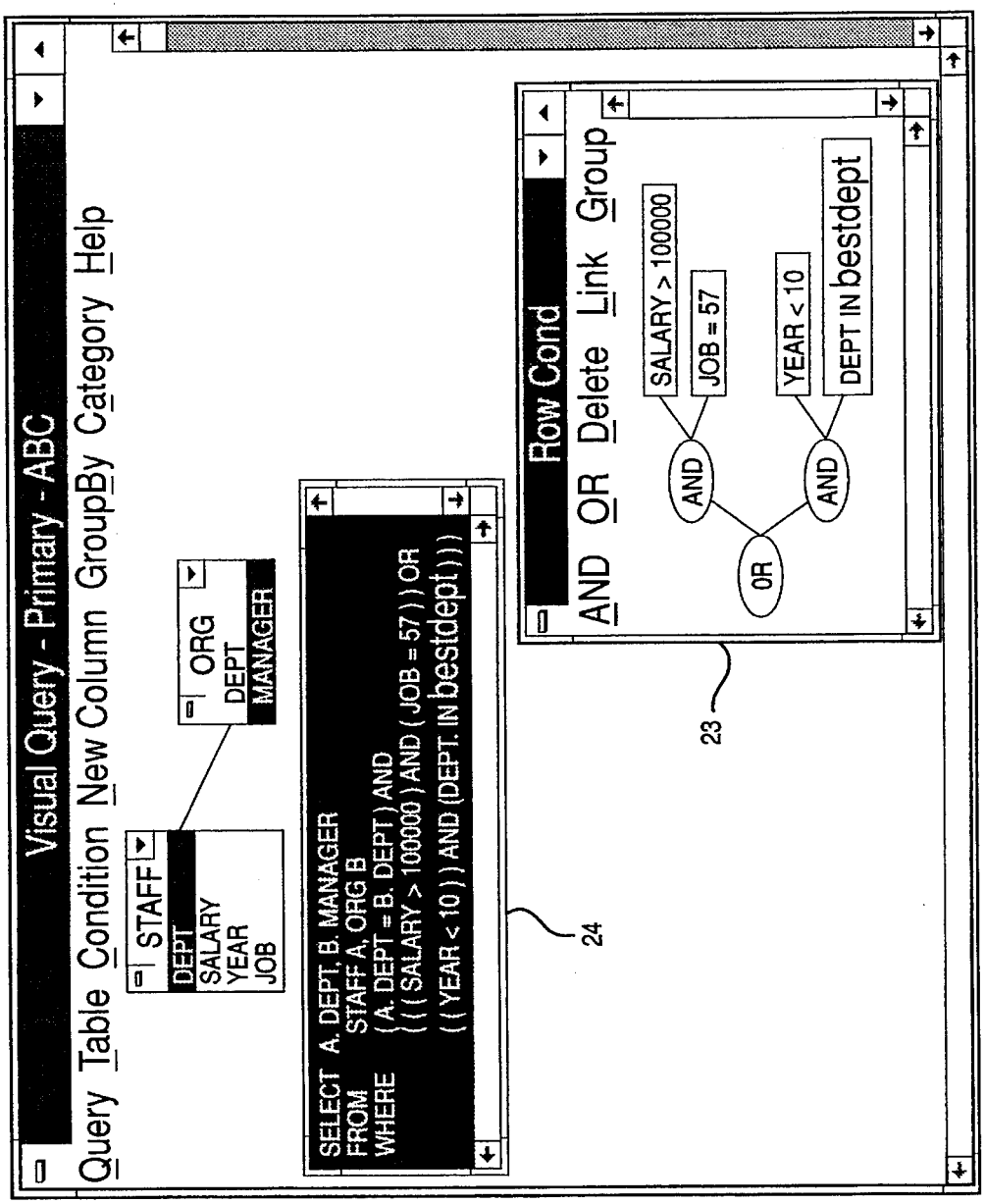
Figure 5F:
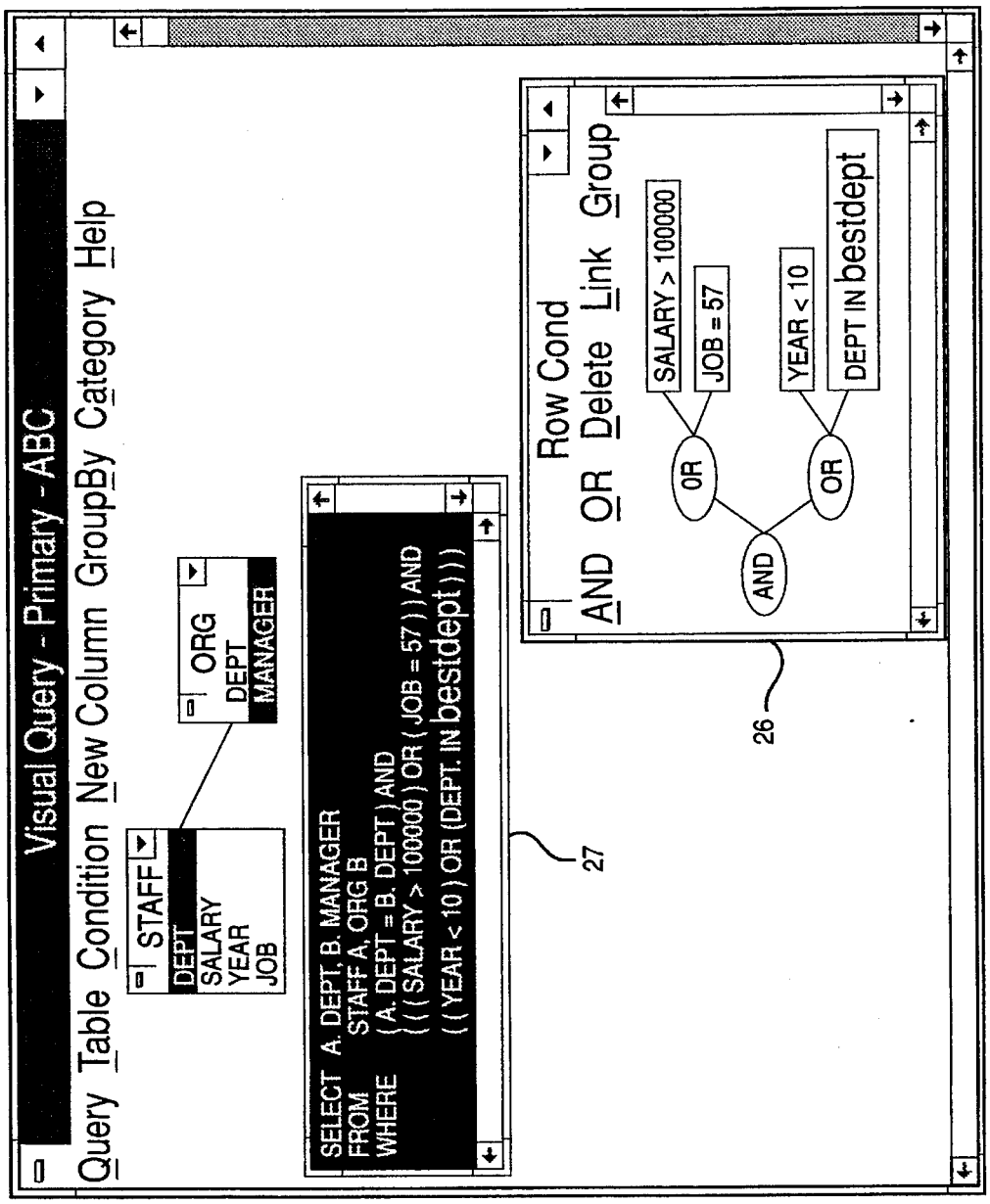

FIG. 5F illustrates the ease with which a graphical interchange of logical operators can be accomplished in the context of the tree structure when the user has doubts about one or more logical links, or desires to see the effects of rearranging the tree. It should be apparent that the query expressed by the tree in subwindow 23 of FIG. 5E is readily understood to differ from the argument as represented by the tree in subwindow 26 of FIG. 5F. In contrast, note the significant mental juggling required to appreciate the differences when comparing the SQL statements as appear in subwindow 24 of FIG. 5E and subwindow 27 of FIG. 5F.

Figure 5G:
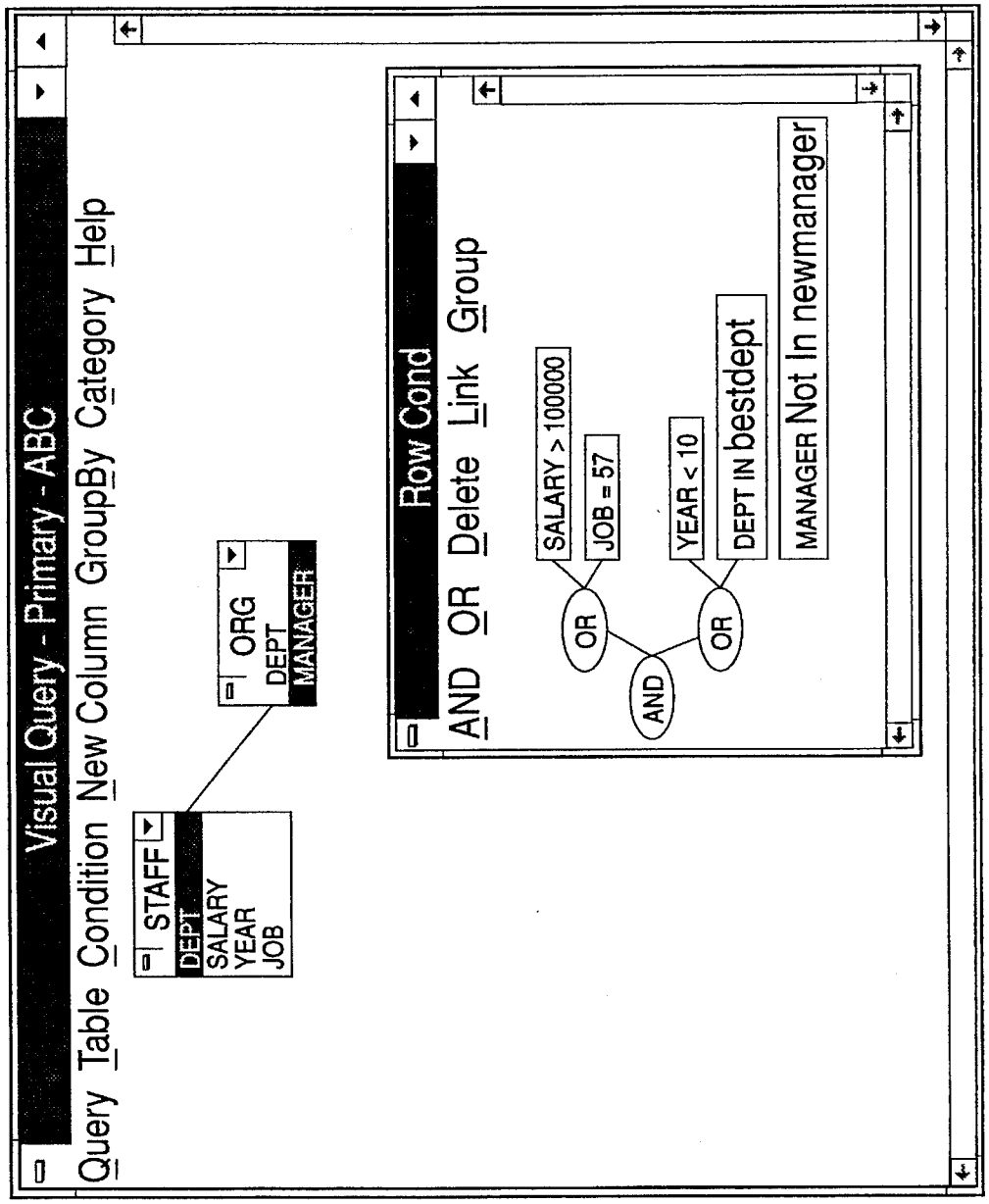
Figure 5H:
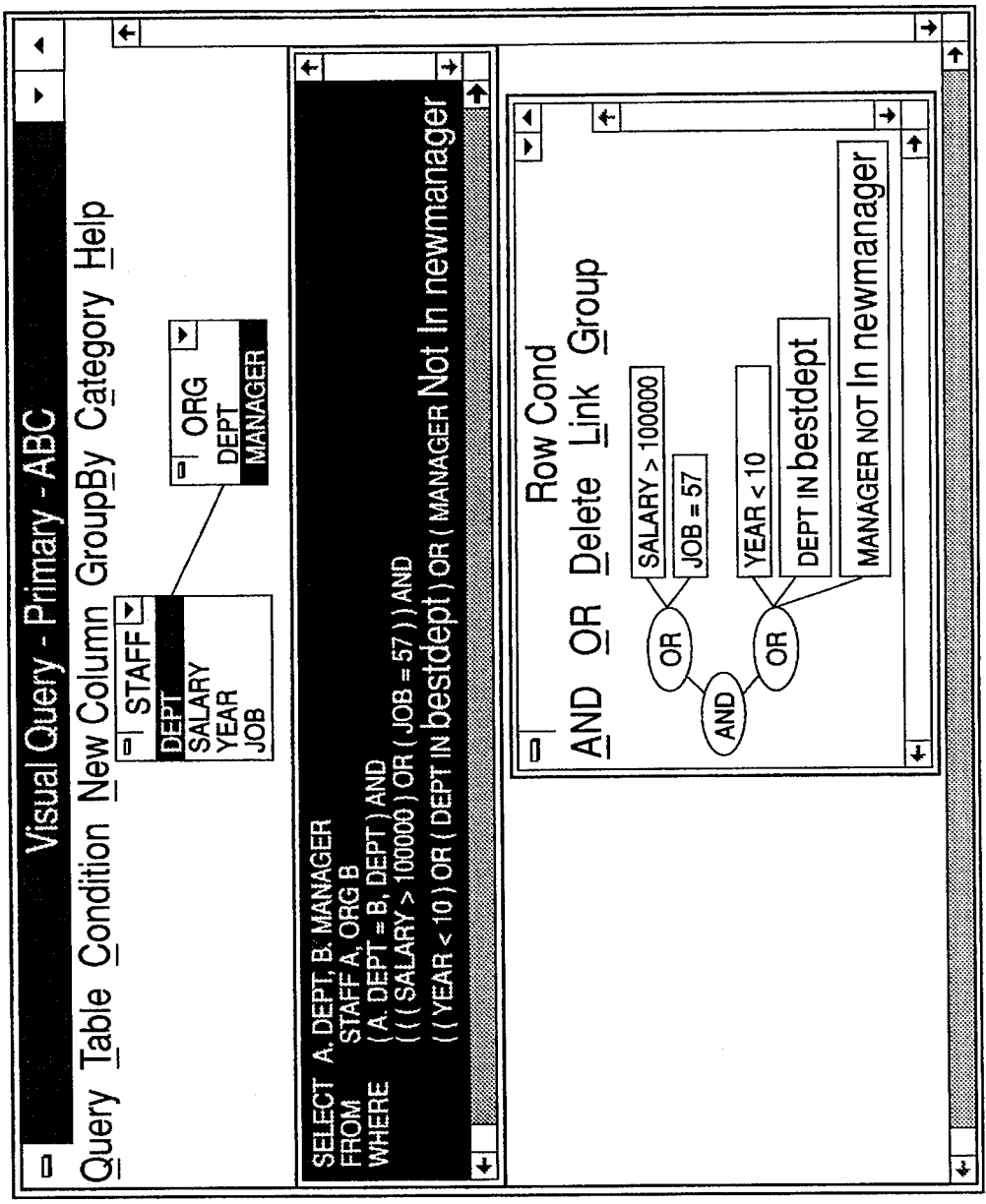

FIG. 5G illustrates that a user can readily add new predicates to an existing WHERE clause tree structure. FIG. 5H illustrates the ease with which the newly defined predicate is linked to a previously specified logical operator, in this case OR, and continues to allow the user to retain intuitive understanding of the complex WHERE clause being defined. This is in distinct contrast to the difficulty a user experiences in trying to understand the SQL based WHERE expression set forth above, given that the user must rely upon deciphering the multiplicity of parentheses to understand the interaction of the logical operators and predicates.

Figure 5I:
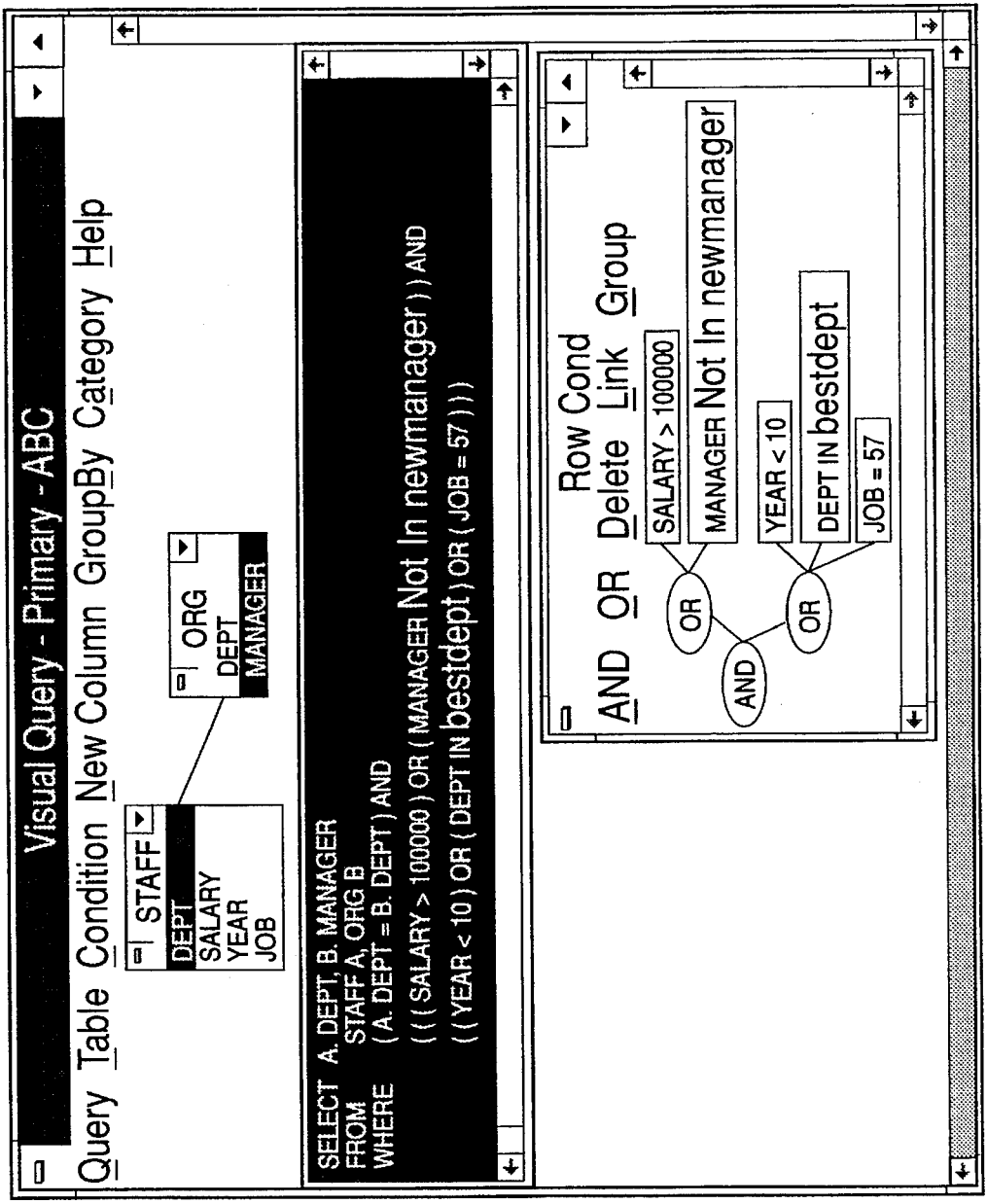
Figure 6C:
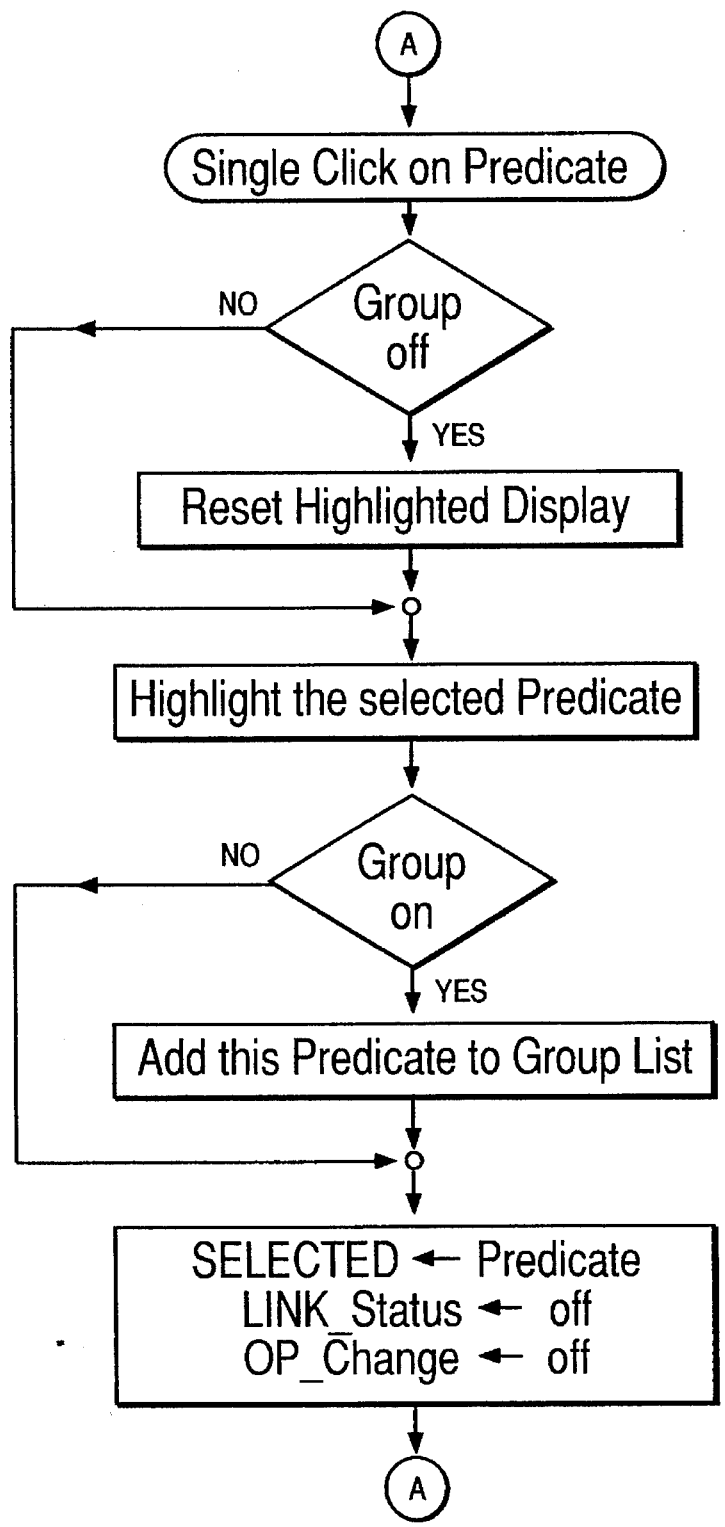
Figure 6D:
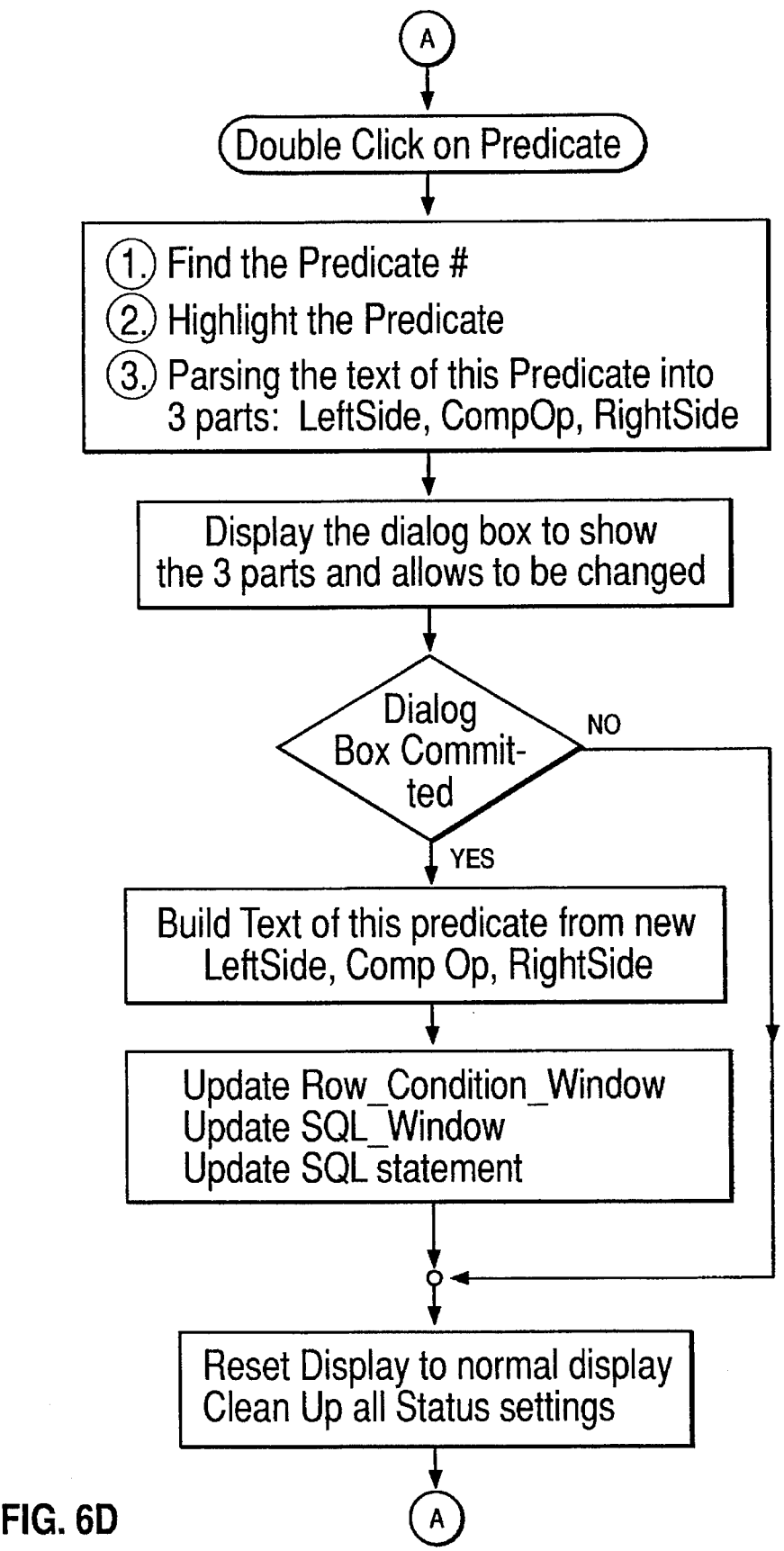
Figure 6E:
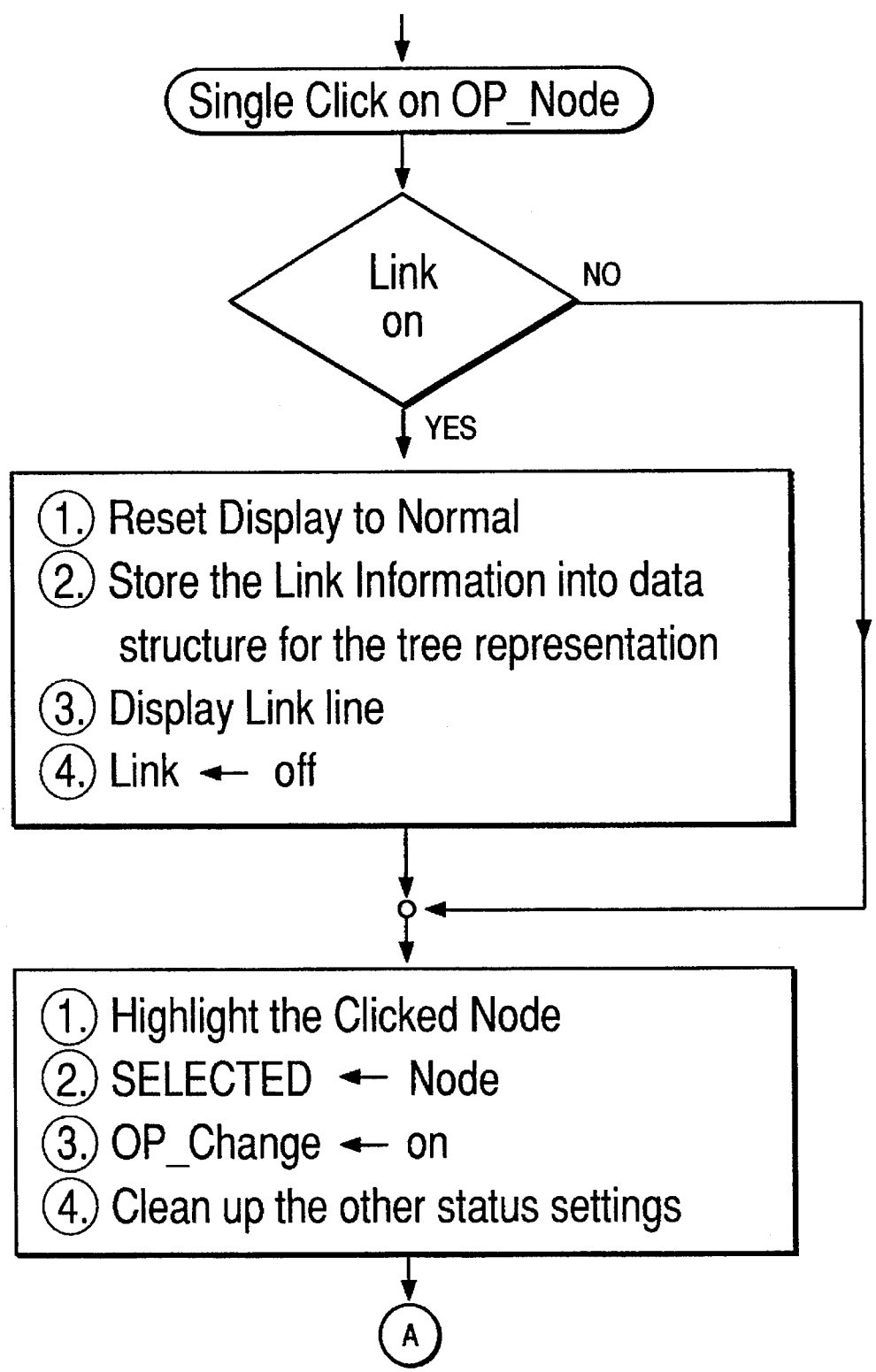
Figure 6F:
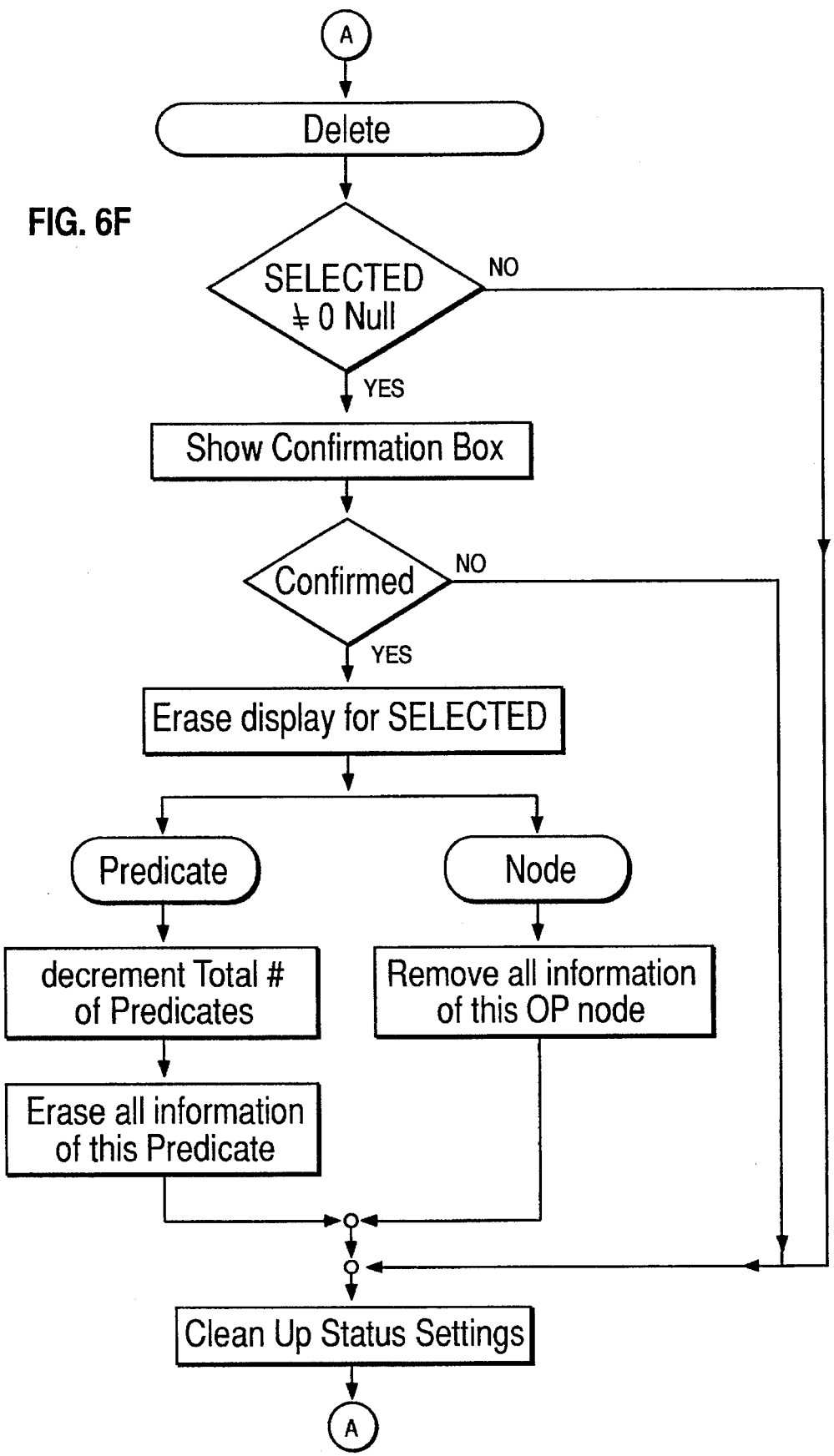
Figure 6G:
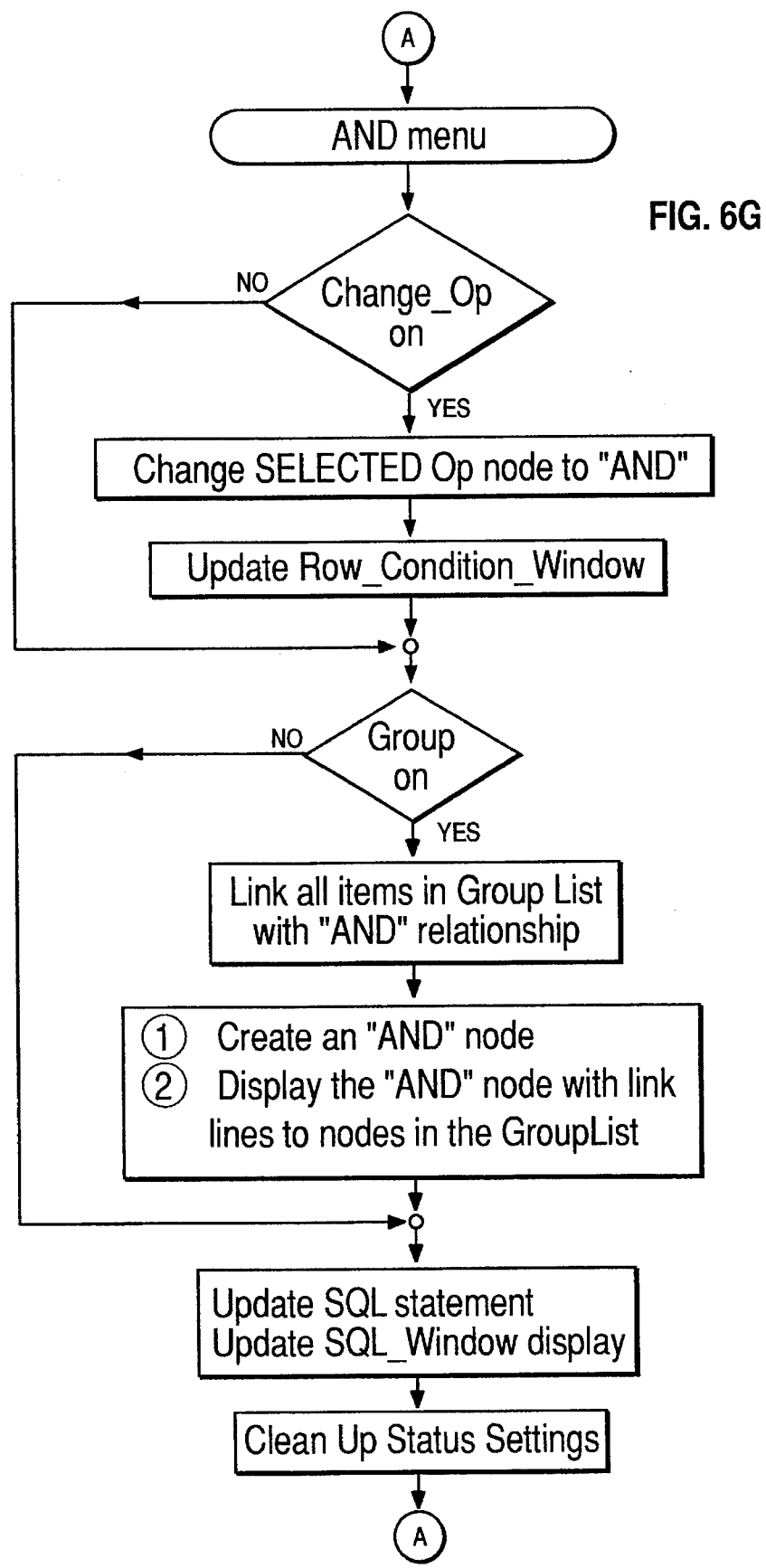
Figure 6H:
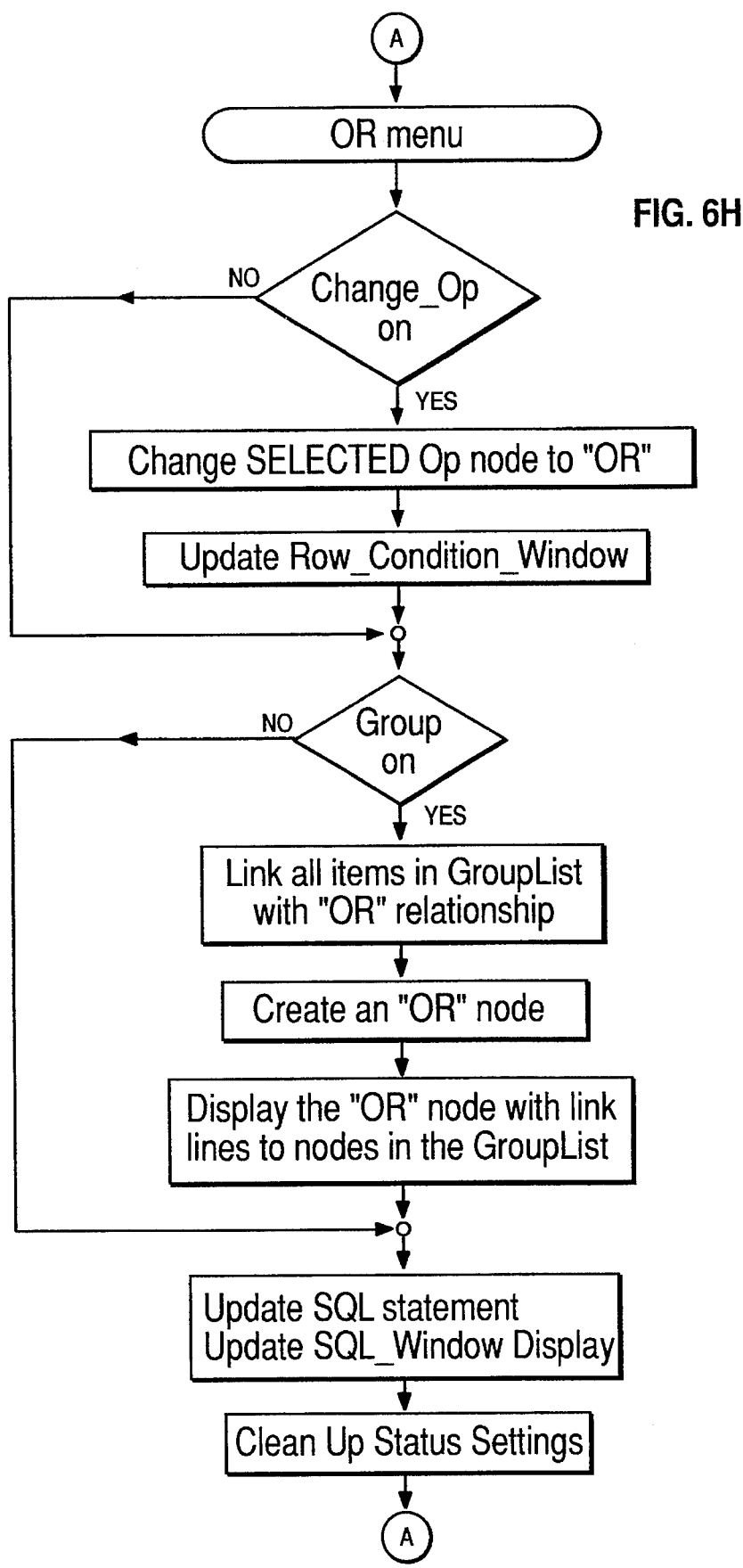
Figure 6I:
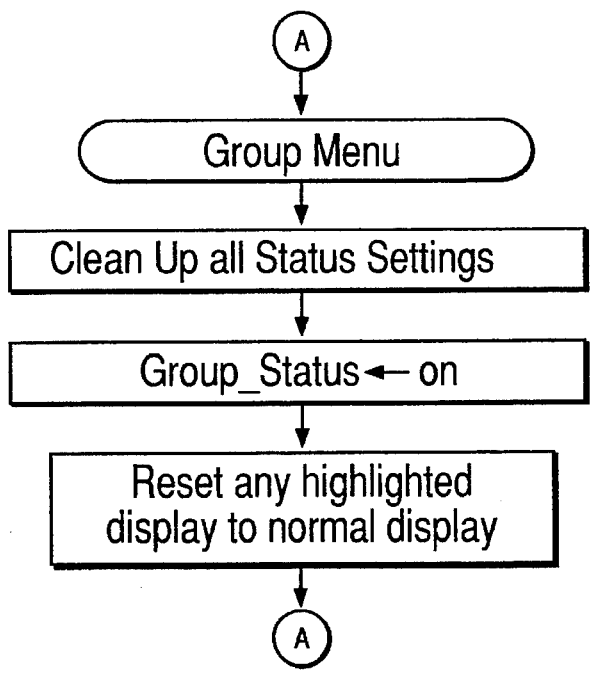
Figure 6J:
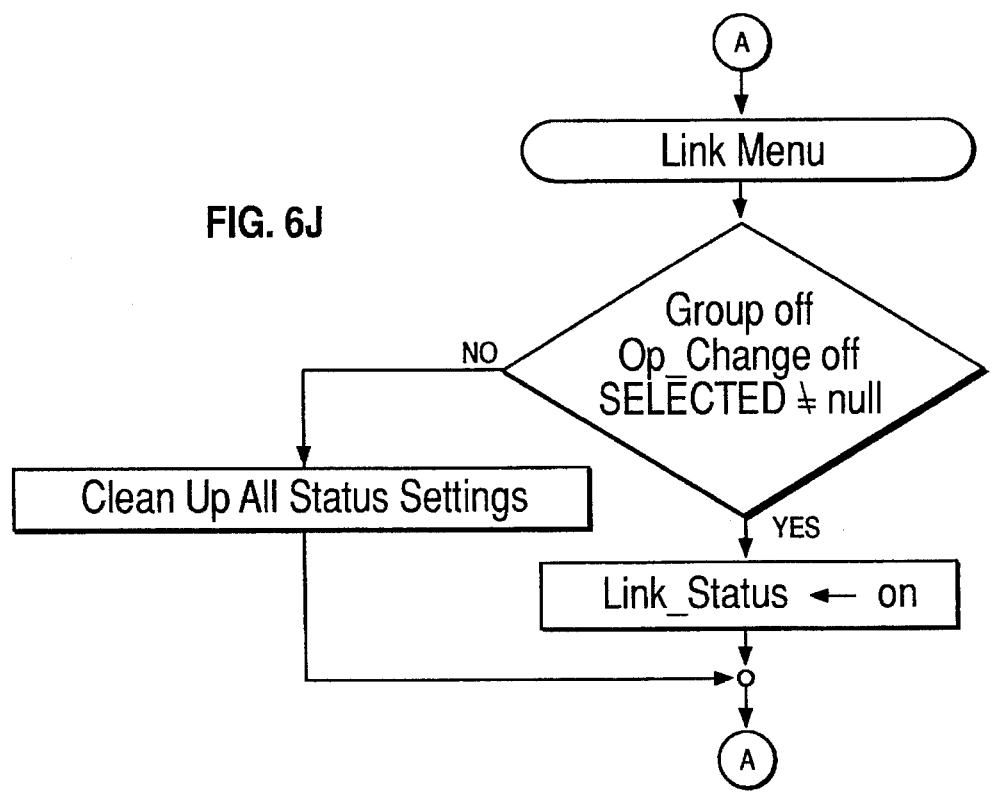

FIG. 5I further illustrates the ease with which the predicates in FIG. 5H can be relocated in the tree structure. Again, note the contrast between attempting a comparison of the tree representations to the equivalent SQL representations of the WHERE clause arguments as appear in the respective subwindows of FIGS. 5H and 5I. It is this ability of the tree arrangement to convey an intuitive representation of the relationships between predicates which makes the invention particularly useful to users of moderate skill.

FIGS. 6A–6J present, in object oriented format, flow diagrams relating significant operations performed by the invention. The symbol "A" within a circle represents a state within which the system, program or process is awaiting an input from the user. The selection provided by the user thereafter defines which of the sequences, FIGS. 6B–6J, are undertaken in generating or modifying the tree structure or its functional equivalent SQL statement.

Pseudo code, from which source code can be derived, for the program of the present invention is set forth below. The cases represented are consistent with the selections in the flow diagrams in FIGS. 6A–6J.

The invention thus provides a user of a relational database with an intuitive and user friendly tool for operating and manipulating queries containing WHERE or HAVING clauses using graphical representations. The intuitive feedback provided by the tree structure makes it easy to understand the substance of the database query being formulated. The concurrent presence of the tree structure and SQL statement allows the user to manipulate either in creating the desired expression. Such concurrency also provides a training tool for users of SQL statements, in that the meanings underlying SQL statements are immediately available in graphical form as feedback. The contemplated tree structure is not binary in character, and as such is not restricted to two predicates per logical operator. Similarly, the tree structure leaves are related to the SQL predicates on a 1:1 basis. The combination thus provides the intuitive link needed by a contemporary user of relational databases.

Though the invention has been described and illustrated by way of specific embodiments, the apparatus and methods should be understood to encompass the full scope of the features defined by the claims set forth hereinafter.

We claim:

1. A computer system for accessing information in a relational database of a computer, comprising:

means for a user of the computer to define predicates of a query to be executed in the computer by direct graphical manipulation of images on a video display of the computer;

means for depicting WHERE or HAVING clauses of the query in graphical format on the video display of the computer and in response to user manipulation using a tree structure which links three or more predicates for a logical operator;

means for deriving an SQL statement equivalent of the tree structure which links three or more predicates; and means for accessing information from the relational database using the derived SQL statement.

2. The system recited in claim 1, wherein the logical operators are AND and OR functions.

3. The system recited in claim 2, wherein the means for a user to define a query includes both keyed alphanumeric entry and user actuated graphic control device entry.

4. A computer implemented method for creating a database search in a relational database of a computer, comprising the steps of:

graphically defining within the computer one or more logical operators of a query by direct user manipulation of images on a video display of the computer;

graphically defining within the computer three or more predicates of the query by direct user manipulation of images on a video display of the computer;

defining within the computer a WHERE or HAVING clause for the query through links relating three or more predicates to a common logical operator by direct user manipulation of graphical format images on the video display of the computer;

deriving within the computer an SQL statement equivalent of the WHERE or HAVING clauses for the query; and executing a relational database search within the computer using the derived SQL statement.

5. The method recited in claim 4, wherein the logical operators are AND and OR functions.

* * * * *